No. 875,881. PATENTED JAN. 7, 1908.
E. G. ACHESON.
METHOD OF DISINTEGRATING GRAPHITE.
APPLICATION FILED DEC. 17, 1906.
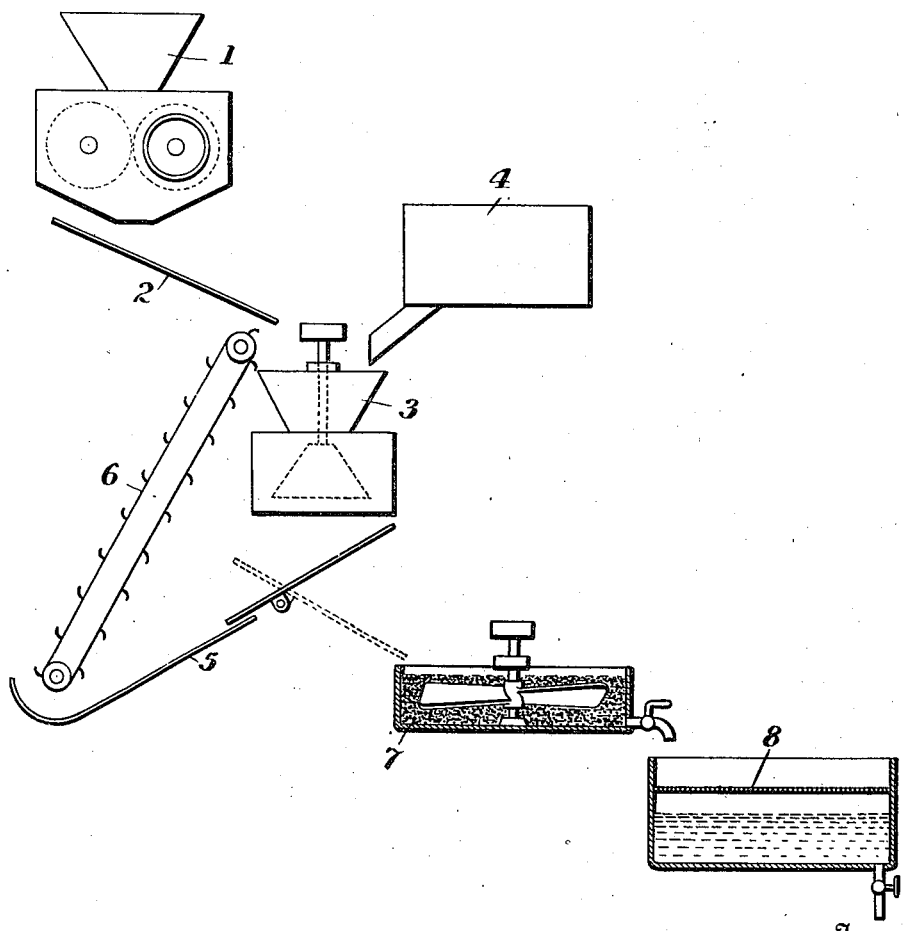

UNITED STATES PATENT OFFICE.

EDWARD GOODRICH ACHESON, OF STAMFORD TOWNSHIP, WELLAND COUNTY, ONTARIO, CANADA.

METHOD OF DISINTEGRATING GRAPHITE.

No. 875,881.   Specification of Letters Patent.   Patented Jan. 7, 1908.

Application filed December 17, 1906. Serial No. 348,314.

*To all whom it may concern:*

Be it known that I, EDWARD GOODRICH ACHESON, a citizen of the United States, residing at Stamford township, in the county of Welland, Province of Ontario, Canada, have invented certain new and useful Improvements in the Method of Disintegrating Graphite, of which the following is a specification.

My invention relates to a method of disintegrating graphite and has for its object to provide a simple, cheap, and effective method whereby graphite can be disintegrated into very small particles or molecules, and thus be used for many and various purposes; and to this end my invention consists in a method embodying the steps substantially as hereinafter more particularly pointed out.

In the use of artifically prepared graphite, especially unctuous graphite as a lubricator, the molecules have a tendency to coalesce or flocculate into measurable sized particles or masses, which is objectionable under certain conditions, and one of the objects of my present invention is to avoid these objections. In accomplishing this object I first prepare the graphite by disintegrating the masses into the smallest particles or molecules and then treating the graphite thus prepared so that the particles or molecules will not coalesce and preferably so that they may be miscible with and remain suspended in oil, water and the like.

In carrying out the first object in connection with artificially prepared graphite, the graphite is removed from the electrical furnace in masses of some magnitude and is separated in some suitable way as by passing it through a disintegrator that breaks or tears it apart into comparatively small masses or particles, which are properly spoken of as pseudomorphs of decomposed carbids.

In order to disintegrate or reduce the graphite to the smallest possible sub-division the graphite as above prepared is mixed with a suitable soluble body or substance and it is desirable to get a most intimate mixture so as to disintegrate or divide the graphite into very small particles or what may properly be described as molecules. I may use various materials as soluble bodies, as for instance borax, dextrin, sugar, soda, etc. This intimate mixture may be accomplished in any suitable way as by friction produced by agitating or rubbing the mixture, and by the aid of any suitable means, as a bur mill, a rubbing or grinding machine or the like, and by repeated operations a thorough and intimate mixture of the graphite and soluble body is obtained. The best results appear to be obtained when the particles of the soluble body are coated with the small particles or molecules of graphite. When this has been satisfactorily accomplished the resultant product is treated in a suitable way to completely separate the graphite and soluble body and eliminate the latter from the small particles or molecules of graphite. This may be done by immersing the product in a solvent of the soluble body and separating the solution from the graphite, which may be washed and dried, by the use of a filter or other well known means. The thus finely disintegrated graphite may be used in any desired manner and when it is to be used as a lubricant it may be treated with tannin or equivalent material to render it miscible in oil and water, substantially as more fully set forth in my application, Serial No. 347,185, filed December 10, 1906.

To specifically illustrate my invention, equal quantities of graphite and borax are mixed together and passed repeatedly through a bur mill or other device until there is a most intimate mixture and preferably until the particles of the soluble body are coated with the small particles or molecules of graphite, and the resultant product is thrown into water, preferably hot water when borax is used, and the soluble body is dissolved and the solution filtered and the graphite washed and dried and it is found to be disintegrated into very small particles or molecules which can be used and treated as above indicated or in any other desired manner.

In the accompanying drawings I have diagrammatically illustrated mechanism which may be used in carrying out my process, but it is to be understood that this mechanism forms no part of my present invention, and that other mechanism may be used for the purpose.

In these drawings I have shown a disintegrator 1 which is used for breaking up the graphite as above described. The graphite passes from this disintegrator down the incline 2 and into the bur mill 3, and as it enters this mill it is mixed with the solvent which is supplied from the receptacle 4.

The mixture after it is discharged from the bur mill may pass down the incline 5 and be again discharged into the bur mill by the elevator 6 for the purpose of regrinding it. When sufficiently ground the material is discharged into the tank 7 where it is mixed with a liquid which dissolves the solvent. This liquid carrying the fine particles of graphite with it is discharged into a filter 8 where the graphite is separated from the liquid by filtration.

What I claim, is—

1. A process for disintegrating graphite, consisting in frictionally mixing graphite with a soluble body and then dissolving said soluble body.

2. A process for disintegrating graphite, consisting in grinding graphite and a soluble body together whereby the two are intimately mixed and the graphite is disintegrated, and then dissolving the soluble body.

3. A process for disintegrating graphite, consisting in mixing graphite with a soluble body, disintegrating the mixture, and then dissolving said soluble body.

4. A process for disintegrating graphite, consisting in finely dividing said graphite, mixing said divided graphite intimately with a soluble body, disintegrating the mixture, and then dissolving the soluble body.

In testimony whereof I affix my signature in presence of two witnesses.

EDWARD GOODRICH ACHESON.

Witnesses:
H. B. BODINE,
W. A. SMITH.